United States Patent
Argomaniz (10) Patent No.: US 12,474,714 B2
(45) Date of Patent: Nov. 18, 2025

(54) SYSTEM AND METHODOLOGY THAT FACILITATES TAKING CONTROL OF A VEHICLE FROM A REMOTE DEVICE

(71) Applicant: Stop Technologies, Inc., Montclair, CA (US)

(72) Inventor: Manuel Argomaniz, Montclair, CA (US)

(73) Assignee: STOP TECHNOLOGIES, INC., Montclair, CA (US)

( * ) Notice: Subject to any disclaimer, the term of this patent is extended or adjusted under 35 U.S.C. 154(b) by 0 days.

(21) Appl. No.: 17/344,660

(22) Filed: Jun. 10, 2021

(65) Prior Publication Data

US 2022/0397909 A1     Dec. 15, 2022

(51) Int. Cl.
*G05D 1/00* (2024.01)
*B60W 60/00* (2020.01)

(52) U.S. Cl.
CPC ......... *G05D 1/0278* (2013.01); *G05D 1/0022* (2013.01); *G05D 1/0223* (2013.01)

(58) Field of Classification Search
CPC ... G05D 1/0278; G05D 1/0022; G05D 1/0223
See application file for complete search history.

(56) References Cited

U.S. PATENT DOCUMENTS

| | | |
|---|---|---|
| 4,619,231 A | 10/1986 | Stolar et al. |
| 5,503,059 A | 4/1996 | Pacholok |
| 5,539,377 A | 7/1996 | Dillon |
| 5,554,891 A | 9/1996 | Shimizu et al. |
| 5,586,457 A | 12/1996 | Keener |
| 5,595,258 A | 1/1997 | Georgas et al. |
| 5,608,272 A | 3/1997 | Tanguay |
| 5,805,057 A | 9/1998 | Eslaminovin |
| 5,926,086 A | 7/1999 | Escareno et al. |
| 5,977,654 A | 11/1999 | Johnson et al. |
| 6,072,248 A | 6/2000 | Muise et al. |
| 6,124,805 A | 9/2000 | Gabbard |
| 6,371,000 B1 | 4/2002 | Hutmacher et al. |
| 6,400,042 B1 | 6/2002 | Winner, Jr. et al. |

(Continued)

FOREIGN PATENT DOCUMENTS

WO    WO-2011027145 A  *  3/2011  ............. B60R 25/04

*Primary Examiner* — Anne Marie Antonucci
*Assistant Examiner* — Jingli Wang
(74) *Attorney, Agent, or Firm* — Daniel S. Castro; LOZA & LOZA, LLP (57) ABSTRACT

Various aspects directed towards controlling vehicles are disclosed. In a first aspect, a permission request is received from a remote device, and an authentication of the permission request is performed that depends on a distance between the vehicle and a pursuing vehicle. Control of a device on the vehicle is then granted to the remote device based on the authentication. In another aspect, an override permission request is received from a remote device, and an authentication of the override permission request is performed. Override control of a device on the vehicle is then granted to the remote device based on the authentication. In yet another aspect, permission to control a device on a vehicle is requested from a remote device, and an authentication of the remote device is performed to determine authorization to control the device. The device is then controlled from the remote device based on the authentication.

19 Claims, 10 Drawing Sheets

(56) References Cited

U.S. PATENT DOCUMENTS

| | | | |
|---|---|---|---|
| 6,411,217 B1 | 6/2002 | Gabbard | |
| 6,897,762 B2 | 5/2005 | Howells | |
| 7,068,152 B2 | 6/2006 | Hager | |
| 7,111,559 B1 | 9/2006 | MacLachlan | |
| 7,141,890 B1 | 11/2006 | Gallardo et al. | |
| 7,272,469 B2 | 9/2007 | Kalau et al. | |
| 7,388,465 B2 | 6/2008 | Simon | |
| 7,548,154 B2 | 6/2009 | Shimomura | |
| 7,859,129 B2 | 12/2010 | Ozawa et al. | |
| 8,387,735 B2 | 3/2013 | Elson | |
| 8,798,855 B2 | 8/2014 | Seymour et al. | |
| 8,805,599 B2 | 8/2014 | Hibbert | |
| 9,079,555 B2 | 7/2015 | Kaufman et al. | |
| 9,134,986 B2 | 9/2015 | Ricci | |
| 9,878,690 B2 | 1/2018 | Thompson et al. | |
| 2002/0116117 A1* | 8/2002 | Martens | G08G 1/017 |
| | | | 701/115 |
| 2007/0222292 A1 | 9/2007 | Shimomura | |
| 2007/0288127 A1* | 12/2007 | Haq | B60R 25/10 |
| | | | 701/2 |
| 2013/0033369 A1 | 2/2013 | Burnett | |
| 2017/0015276 A1 | 1/2017 | Ghadhban | |
| 2018/0072263 A1 | 3/2018 | Green | |
| 2019/0202403 A1 | 7/2019 | Taljaard | |
| 2020/0114871 A1 | 4/2020 | Kicinski et al. | |
| 2021/0016801 A1* | 1/2021 | Nakagawa | G05D 1/0022 |
| 2021/0302189 A1* | 9/2021 | Buddharaju | G06F 3/04815 |
| 2022/0212680 A1* | 7/2022 | Wang | G05D 1/0022 |
| 2022/0283582 A1* | 9/2022 | Crinklaw | G05D 1/028 |

\* cited by examiner

SYSTEM AND METHODOLOGY THAT FACILITATES TAKING CONTROL OF A VEHICLE FROM A REMOTE DEVICE

TECHNICAL FIELD

The subject disclosure generally relates to motor vehicles, and more specifically to a system and methodology that facilitates taking control of a vehicle from a remote device.

BACKGROUND

High speed police pursuits are dangerous, but often unavoidable. Indeed, such pursuits often cause significant property damage and can result in serious bodily harm to a fleeing suspect, pursuing police officers, and/or innocent bystanders. When trying to end a pursuit, police sometimes deploy spike strips. Often, however, fleeing suspects simply maneuver around spike strips. Another method that is sometimes used by law enforcement is the pursuit intervention technique (PIT) maneuver, wherein a pursuing police car rams into the rear of a fleeing car so as to turn the fleeing vehicle sideways abruptly and cause the driver to lose control. A PIT maneuver is risky, however, since such loss of control itself can cause an accident the results in significant property damage and/or serious bodily harm.

Accordingly, it would be desirable to provide a system and method which overcomes these limitations. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with taking control of a vehicle from a remote device. In one such aspect, a control unit device residing on a vehicle is disclosed, which includes a communication component, an authentication component, and a control component. For this embodiment, the communication component is configured to receive a control permission request from a remote device in which the control permission request is received from the remote device via a wireless communication protocol. The authentication component is configured to perform an authentication of the control permission request such that the authentication depends on whether a pursuing vehicle is within a threshold distance from the vehicle. The control component is then configured to grant the remote device control of at least one device on the vehicle based on the authentication.

Another control unit device residing on a vehicle is disclosed, which also includes a communication component, an authentication component, and a control component. For this embodiment, the communication component is configured to receive an override permission request from a remote device in which the override permission request is received from the remote device via a wireless communication protocol. The authentication component is configured to perform an authentication of the override permission request, whereas the control component is configured to grant the remote device override control of at least one device on the vehicle based on the authentication. Within such embodiment, the remote device override control disables an ability of a driver of the vehicle to control the at least one device.

In a further aspect, a method is provided, which includes employing a processor to execute computer executable instructions stored on a computer readable storage medium to implement various acts. These acts include requesting permission to control at least one device on a vehicle from a remote device, and authenticating whether the remote device has authorization to control the at least one device. The method further includes controlling the at least one device from the remote device based on an authentication of the remote device to control the at least one device.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

As discussed in the background, it is desirable to provide a system and method which overcomes the various limitations of conventional methods for ending high-speed police pursuits. The embodiments disclosed herein are directed towards overcoming such limitations by providing a system and methodology that facilitates taking control of a vehicle from a remote device. For instance, in a particular embodiment, a system and methodology disclosed herein is directed towards granting law enforcement authorization to override control of a vehicle from a driver. In another embodiment, a system and methodology disclosed herein is directed towards granting law enforcement authorization to control a fleeing vehicle when a pursuing law enforcement vehicle is within a threshold distance of the fleeing vehicle.

Figure 1:
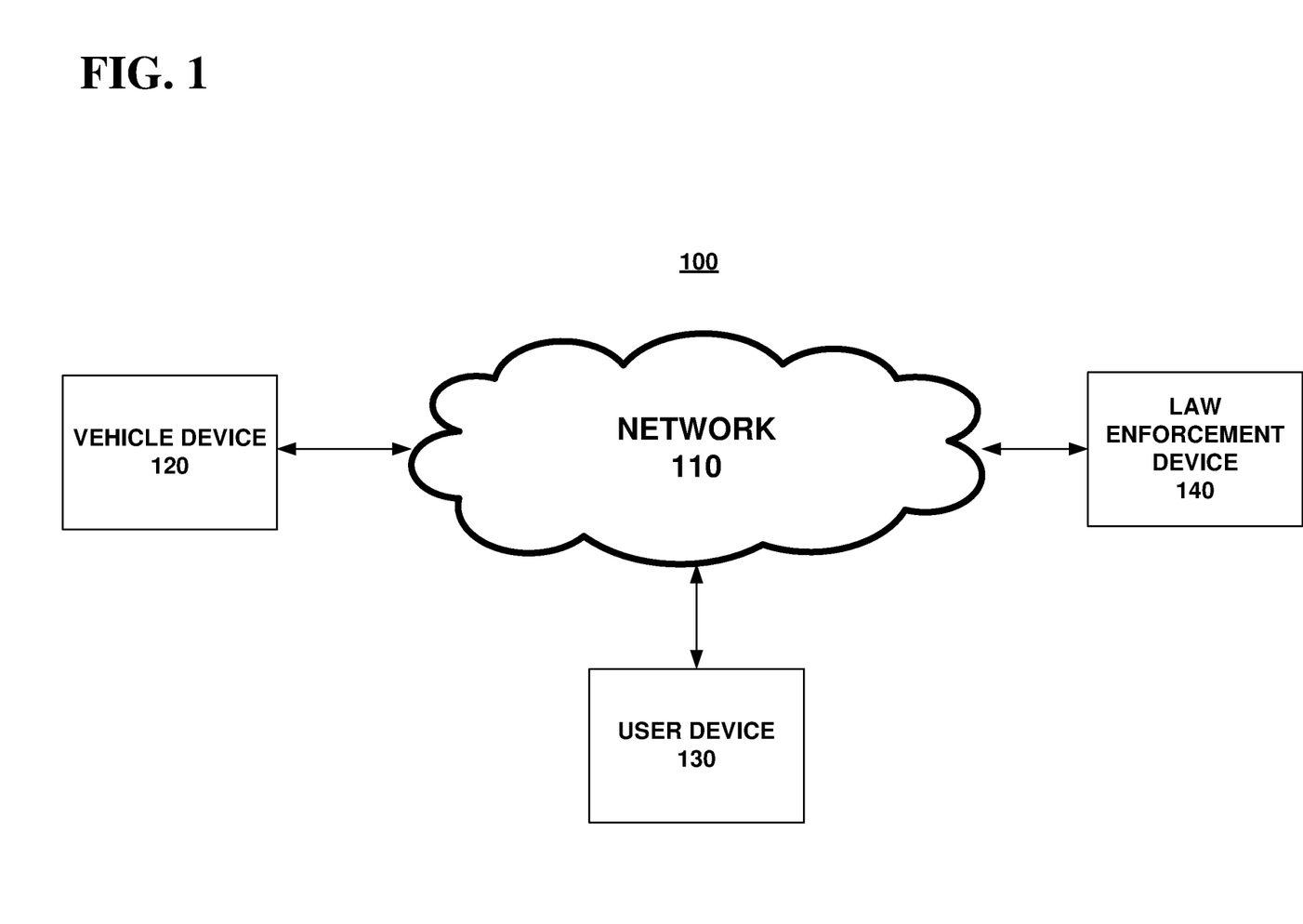
FIG. 1 illustrates an exemplary environment that facilitates taking control of a vehicle from a remote device in accordance with an aspect of the subject specification.

Turning now to FIG. 1, an exemplary environment that facilitates taking control of a vehicle from a remote device is provided according to an embodiment. As illustrated, environment 100 includes the coupling of vehicle device 120, user device 130, and law enforcement device 140 via network 110 (e.g., the Internet, a radio frequency identification (RFID) network, a Bluetooth network, etc.). It is contemplated that vehicle device 120 can reside in any type of vehicle (e.g., car, motorcycle, boat, etc.) and that law enforcement device 140 can reside in any equipment operated by law enforcement including, for example, a police vehicle (e.g., a car, motorcycle, helicopter, etc.). It should also be appreciated that law enforcement device 140 can be a computing device configured to perform various aspects disclosed herein, such as police-issued mobile devices (e.g., a mobile phone, tablet, etc.) and/or computing devices residing in a police station (e.g., a desktop computer, laptop computer, etc.). Meanwhile, it is contemplated that user device 130 may be a computing device such as a personal computer, mobile phone, tablet, etc., wherein user device 130 enables the owner of a vehicle on which vehicle device 120 resides to communicate remotely with vehicle device 120 and/or law enforcement device 140.

Figure 2:
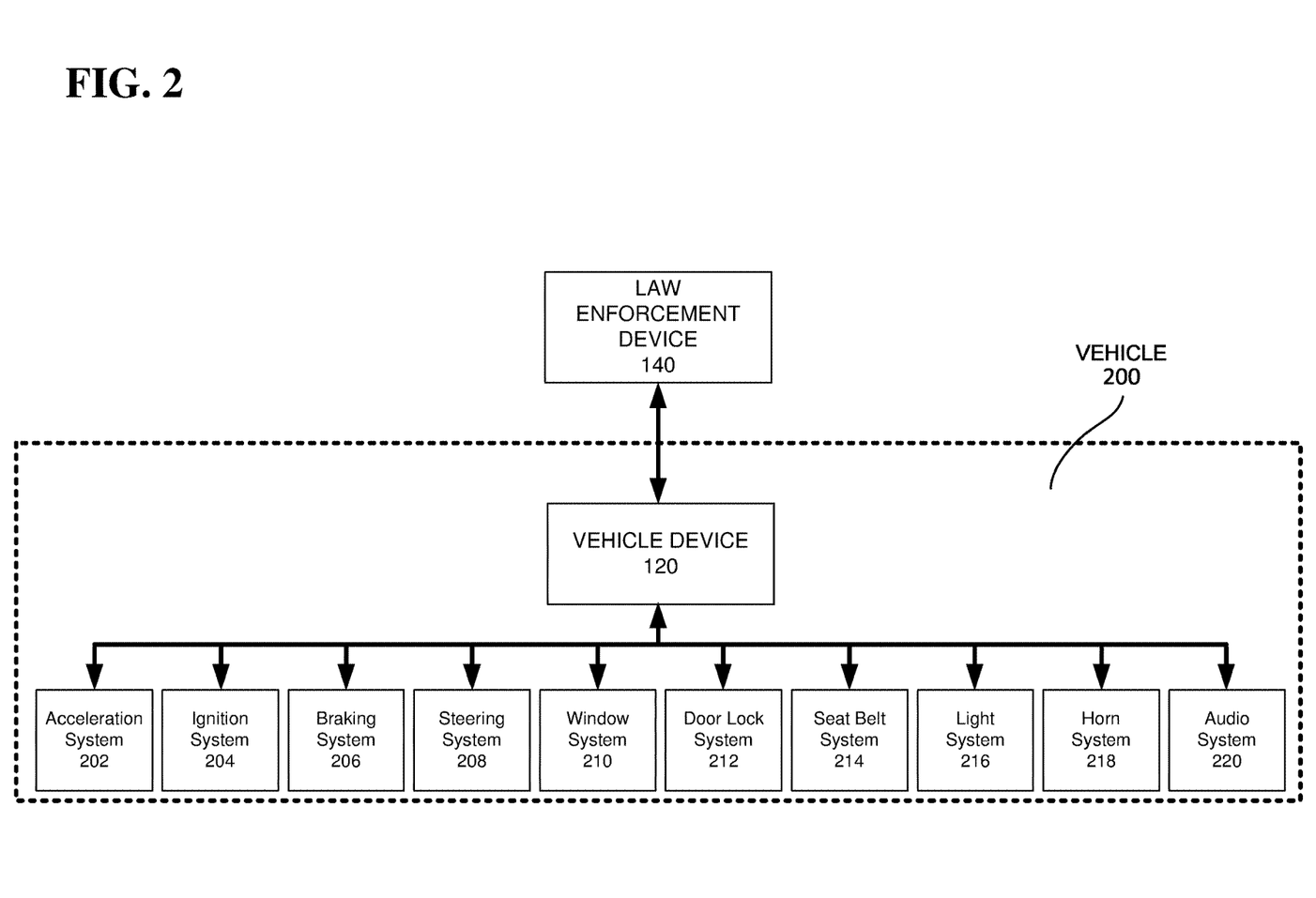
FIG. 2 is a block diagram illustrating exemplary vehicle subsystems that are controllable via a remote device in accordance with an aspect of the subject specification.

Referring next to FIG. 2, a block diagram is provided illustrating exemplary vehicle subsystems that are controllable via a remote device in accordance with aspects disclosed herein. As illustrated, it is contemplated that law enforcement device 140 may be configured to communicate with vehicle device 120 to control any of a plurality of subsystems of vehicle 200. For instance, law enforcement device 140 may be configured to control any of a plurality of drive-related subsystems on vehicle 200 such as acceleration system 202, ignition system 204, braking system 206, and/or steering system 208. In another aspect, in case law enforcement wants to secure vehicle 200 in a particular location, and/or in case law enforcement wants to secure a fleeing suspect within vehicle 200, law enforcement device 140 may also be configured to control any of a plurality of security-related subsystems such as window system 210, door lock system 212, and/or seat belt system 214.

It may also be desirable for law enforcement to control various other subsystems on vehicle 200. For instance, in order to warn the public during a high-speed pursuit of vehicle 200, law enforcement device 140 may be configured to control light system 216 (e.g., by making the headlights of vehicle 200 flash on and off during the pursuit) and/or horn system 218 (e.g., by repeatedly sounding the horn of vehicle 200 during the pursuit). In order to communicate with a fleeing suspect, law enforcement device 140 may also be configured to control audio system 220, wherein audio system 220 may include a microphone system (i.e., to allow the fleeing suspect to speak to law enforcement), as well as a speaker system (i.e., to allow law enforcement to speak to the fleeing suspect).

Exemplary Use Scenarios

Figure 3:
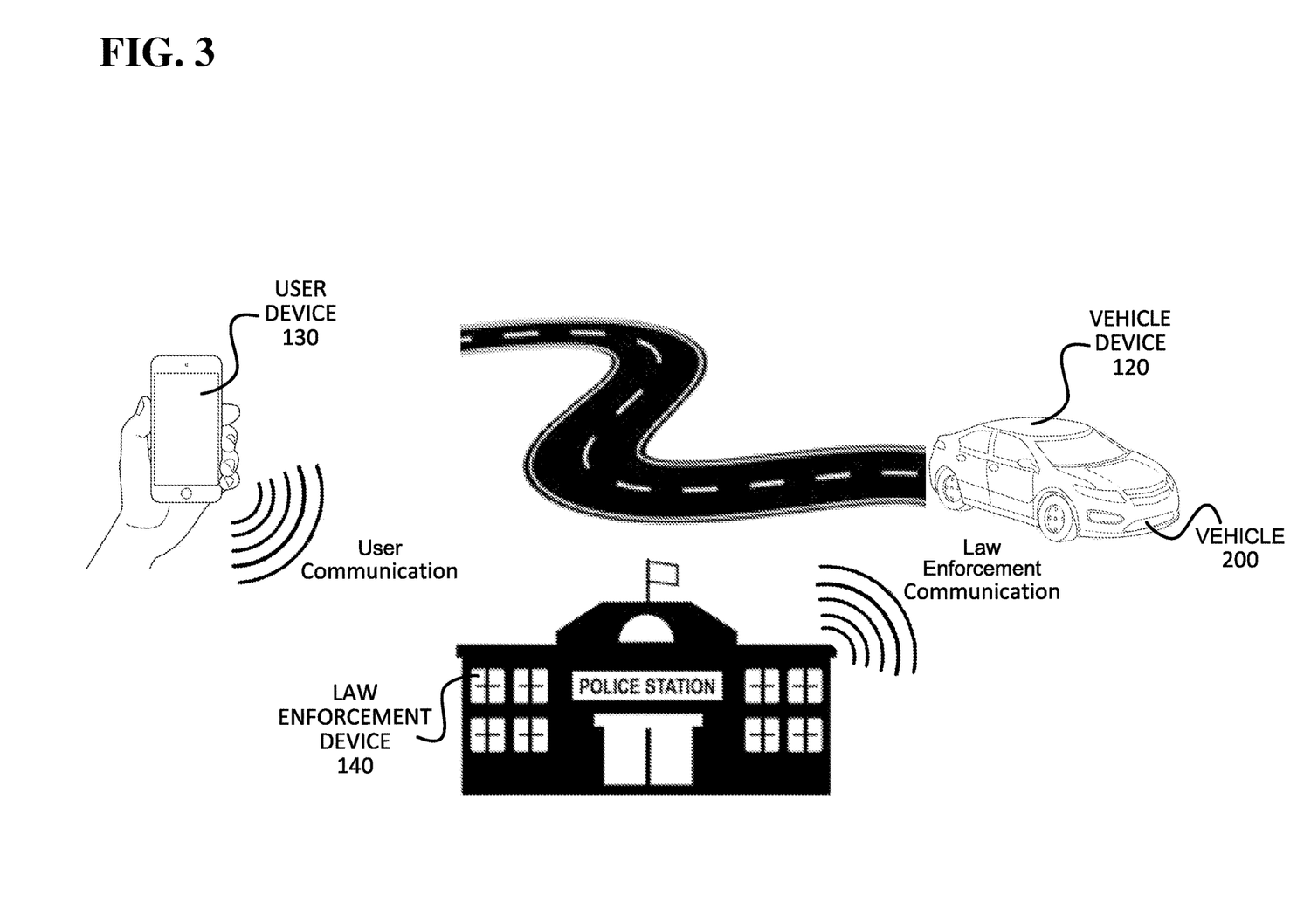
FIG. 3 illustrates a first exemplary use scenario for taking control of a vehicle from a remote device in accordance with an aspect of the subject specification.

Referring next to FIG. 3, a first exemplary use scenario for taking control of a vehicle from a remote device is provided. For this particular scenario, it is contemplated that the owner of vehicle 200 may wish to communicate with vehicle device 120 and/or law enforcement device 140 via user device 130. For instance, if the owner discovers that vehicle 200 has been stolen, user device 130 may be configured to notify law enforcement, wherein law enforcement device 140 may then be used to remotely disable and/or secure vehicle 200. To this end, it should be noted that vehicle 200 may or may not be in operation when law enforcement is notified. Accordingly, it is contemplated that law enforcement device 140 may be configured to communicate with vehicle device 120 to determine how to proceed.

For instance, if vehicle 200 is not in operation (i.e., vehicle 200 is parked), law enforcement device 140 may secure vehicle 200 by sending vehicle device 120 a command to close the windows and lock the doors (i.e., via window system 210 and door lock system 212). To ensure that vehicle 200 is not moved, law enforcement device 140 may also send vehicle device 120 a command to disable any of the various drive-related subsystems of vehicle 200 (e.g., acceleration system 202, ignition system 204, braking system 206, and/or steering system 208). If desired, law enforcement device 140 may even send vehicle device 120 a command to operate as an alarm by repeatedly flashing the headlights and sounding the horn of vehicle 200 (e.g., via light system 216 and horn system 218).

If vehicle 200 is indeed in operation, however, law enforcement device 140 may be used to safely disable vehicle 200. For instance, law enforcement device 140 may be configured to send vehicle device 120 a command to disable any of the various drive-related subsystems of vehicle 200 in a predetermined manner (e.g., where acceleration system 202 is configured to decelerate vehicle 200 via one or more speed limiters). It should also be appreciated that such disabling can be performed via a direct communication from user device 130 to vehicle device 120, rather than via law enforcement device 140.

Alternatively, law enforcement device 140 may be configured to take complete control of all drive-related subsystems of vehicle 200 via vehicle device 120, wherein such control of vehicle 200 may be substantially similar to operation of a drone from a remote location (e.g., from a police station). For this embodiment, it is thus contemplated that, rather than disabling subsystems of vehicle 200, control of these subsystems is transferred from the fleeing suspect to law enforcement.

Figure 4:
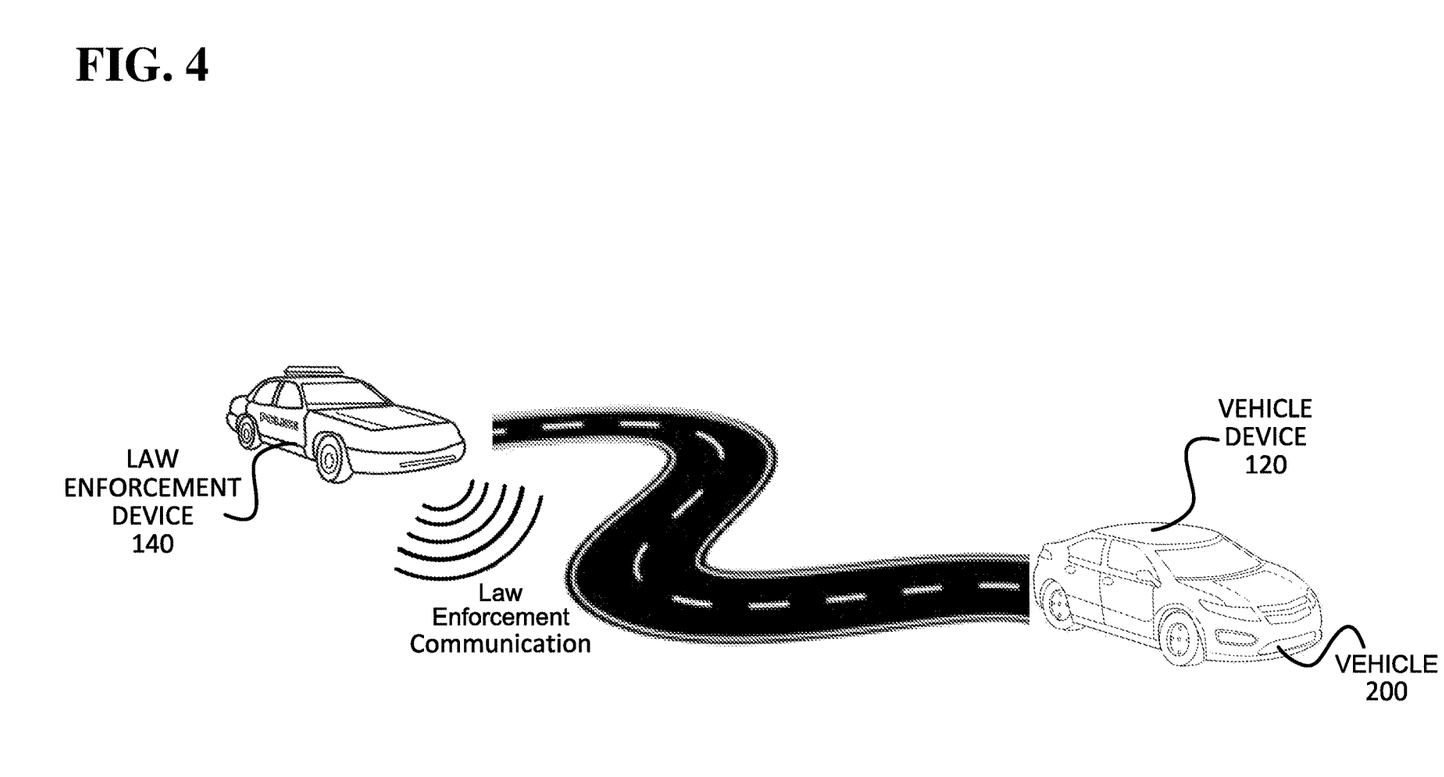
FIG. 4 illustrates a second exemplary use scenario for taking control of a vehicle from a remote device in accordance with an aspect of the subject specification.

Referring next to FIG. 4, a second exemplary use scenario for taking control of a vehicle from a remote device is provided. For this particular scenario, a police pursuit of vehicle 200 is considered, as shown, wherein various embodiments are contemplated. For instance, in a first embodiment the control and/or disabling of vehicle 200 via vehicle device 120 depends on a proximity of the pursuing vehicle to vehicle 200. Moreover, it is contemplated that allowing law enforcement device 140 to control and/or disable subsystems of vehicle 200 via vehicle device 120 may include an authentication process in which a minimum distance between the pursuing vehicle and vehicle 200 is required.

It should be appreciated that there are various ways to determine whether the pursuing vehicle and vehicle 200 are within a threshold distance of each other (e.g., 100 meters). For instance, as part of an authentication process to confirm whether law enforcement device 140 has the authority to control and/or disable vehicle 200, vehicle device 120 and law enforcement device 140 can exchange global positioning system (GPS) data with each other via network 110 (e.g., the Internet, a radio frequency identification (RFID) network, a Bluetooth network, etc.). Alternatively, the transmission of signals having a limited range can be used (e.g., where RFID communications have a range of ~100 meters), wherein authentication depends on whether vehicle device 120 can detect such signals from law enforcement device 140, or vice versa.

It should be further appreciated that components of law enforcement device 140 can reside in different physical locations. For instance, while some components may reside on a police vehicle, other components of law enforcement device 140 may reside on any computing device configured to perform various aspects disclosed herein, such as police-issued mobile devices (e.g., a mobile phone, tablet, etc.) and/or computing devices residing in a police station (e.g., a desktop computer, laptop computer, etc.). The authentication of law enforcement device 140 may be performed via components residing on a pursuing police vehicle, for example, whereas the actual controlling/disabling of vehicle 200 may be performed by components residing in a police station.

Exemplary Vehicle Device Embodiments

Figure 5:
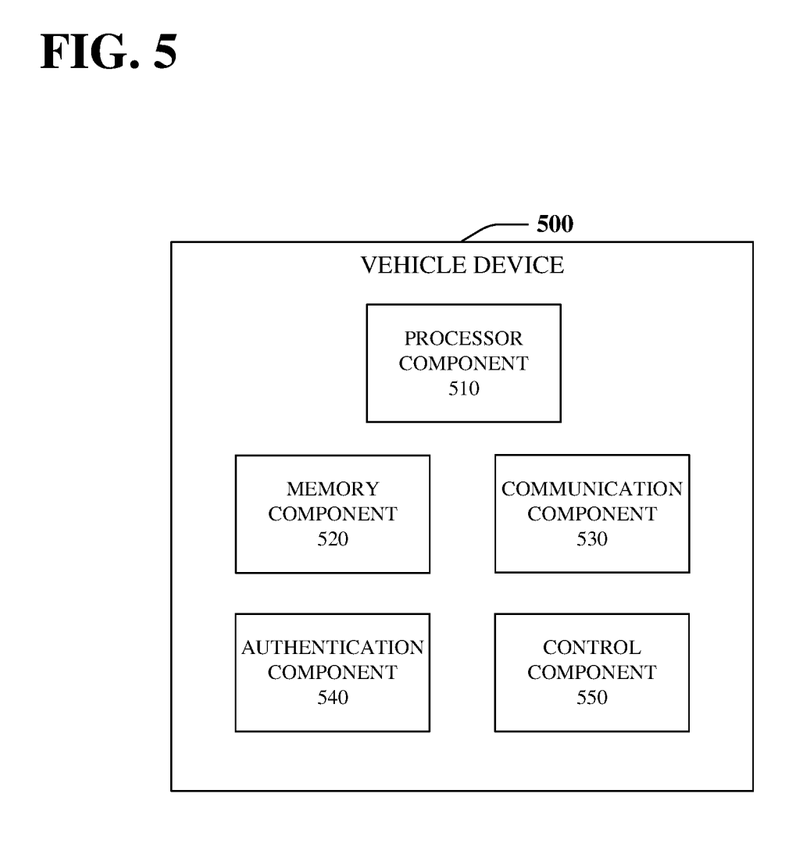
FIG. 5 illustrates a block diagram of an exemplary vehicle device that facilitates implementing aspects disclosed herein.

Referring next to FIG. 5, a block diagram of an exemplary vehicle device is provided, wherein it is contemplated that vehicle device 500 is substantially similar to vehicle device 120. As illustrated, vehicle device 500 may include a processor component 510, a memory component 520, a communication component 530, an authentication component 540, and a control component 550. Components 510-540 may reside together in a single location or separately in different locations in various combinations, including, for example, a configuration in which at least one of the aforementioned components reside in a cloud.

In one aspect, processor component 510 is configured to execute computer-readable instructions related to performing any of a plurality of functions. Processor component 510 can be a single processor or a plurality of processors which analyze and/or generate information utilized by memory component 520, communication component 530, authentication component 540, and/or control component 550. Additionally or alternatively, processor component 510 may be configured to control one or more components of vehicle device 500.

In another aspect, memory component 520 is coupled to processor component 510 and configured to store computer-readable instructions executed by processor component 510. Memory component 520 may also be configured to store any of a plurality of other types of data including data generated by any of communication component 530, authentication component 540, and/or control component 550. Memory component 520 may be configured to store any of several types of information explained above, including a GPS location of vehicle device 500, for example.

Memory component 520 can be configured in a number of different configurations, including as random access memory, battery-backed memory, Solid State memory, hard disk, magnetic tape, etc. Various features can also be implemented upon memory component 520, such as compression and automatic back up (e.g., use of a Redundant Array of Independent Drives configuration). In one aspect, the memory may be located on a network, such as a "cloud storage" solution.

Communication component 530 may be used to interface vehicle device 500 with external entities. For example, communication component 530 may be configured to receive and/or transmit data via a network (See e.g., FIG. 1). In a particular embodiment, communication component 530 is configured to receive a control/override permission request from a remote device (e.g., law enforcement device 140) in which the control/override permission request is received from the remote device via a wireless communication protocol (e.g., via a WiFi network, an RFID network, a Bluetooth network, etc.).

As illustrated, vehicle device 500 also includes authentication component 540 and control component 550. Here, it is contemplated that authentication component 540 is configured to perform an authentication of the control/override permission request (e.g., where the authentication depends on whether a pursuing vehicle is within a threshold distance from a pursued vehicle; inclusion of the requesting device on a whitelist/blacklist; etc.), whereas control component 550 is configured to grant the remote device control of at least one device on the vehicle based on the authentication (e.g., where "control" may be defined to include override control which disables an ability of a driver of the vehicle to control the at least one device).

Several embodiments are contemplated for when authentication depends on the distance between a pursuing vehicle and a pursued vehicle. For instance, authentication component 540 may be configured to determine whether the pursuing vehicle is within the threshold distance based on a detection of a signal transmitted from the pursuing vehicle. In a particular embodiment, communication component 530 may be configured to detect signals transmitted from the pursuing vehicle within a detection range of the vehicle, wherein the detection range is less than the threshold distance (e.g., where the signal transmitted from the pursuing vehicle is one of an RFID communication, a Bluetooth communication, or a WiFi communication).

It should be appreciated that the control/override permission request may be received by communication component 530 from any of a plurality of locations. For instance, the remote device may reside in a pursuing police vehicle, wherein the aforementioned signal transmitted from the pursuing vehicle is the control/override permission request. Alternatively, however, the remote device (entirely or in part) may reside in a location different than a location of the pursuing vehicle (e.g., where the remote device (entirely or in part) resided in a police station. In yet another embodiment, the remote device resides in a location different than a location of the pursuing vehicle (e.g., where the remote device resides in a police station), wherein the authentication component 540 is configured to determine whether the pursuing vehicle is within the threshold distance based on a communication received from the remote device.

Various aspects for control component 550 are also contemplated. For instance, control component 550 may be configured to grant the remote device control while the vehicle is in operation, as well as when it is not (e.g., when the vehicle is parked). Also, as indicated with respect to FIG. 2, it is contemplated that control component 550 may be configured to grant the remote device control of any of various subsystems of a vehicle including, for example, any of a plurality of drive-related subsystems (e.g., an acceleration system, an ignition system, a braking system, and/or a steering system), as well as any of a plurality of non-drive-related subsystems (e.g., a power window system, a door lock system, a seatbelt system, a light system, a horn system, and/or an audio system).

It is also contemplated that authentication component 540 may be configured to authenticate the remote device based on the particular subsystem(s) the remote device is requesting to control/override. For example, a request from a remote device to control/override the vehicle's sound system may require that a pursuing police vehicle be within a threshold distance, whereas a request from a remote device to control/override any of the vehicle's drive-related subsystems may additionally require authorization from a supervisor (e.g., a police commander).

In yet another embodiment disclosed herein, vehicle device 500 may be configure to be tamper proof. For instance, an embodiment is contemplated in which vehicle device 500 is physically secured onto a vehicle (e.g., vehicle 200), wherein a physical tampering of vehicle device 500 (e.g., detaching vehicle device 500 from the vehicle; compromising a housing of vehicle device 500; etc.) triggers the transmission of an alert to law enforcement via communication component 530. In addition to detecting whether vehicle device 500 has been mechanically compromised, it is contemplated that vehicle device 500 may also be configured to detect whether software included in vehicle device 500 has been compromised (e.g., via a cyberattack), wherein communication component 530 may similarly be configured to notify law enforcement.

Figure 6:
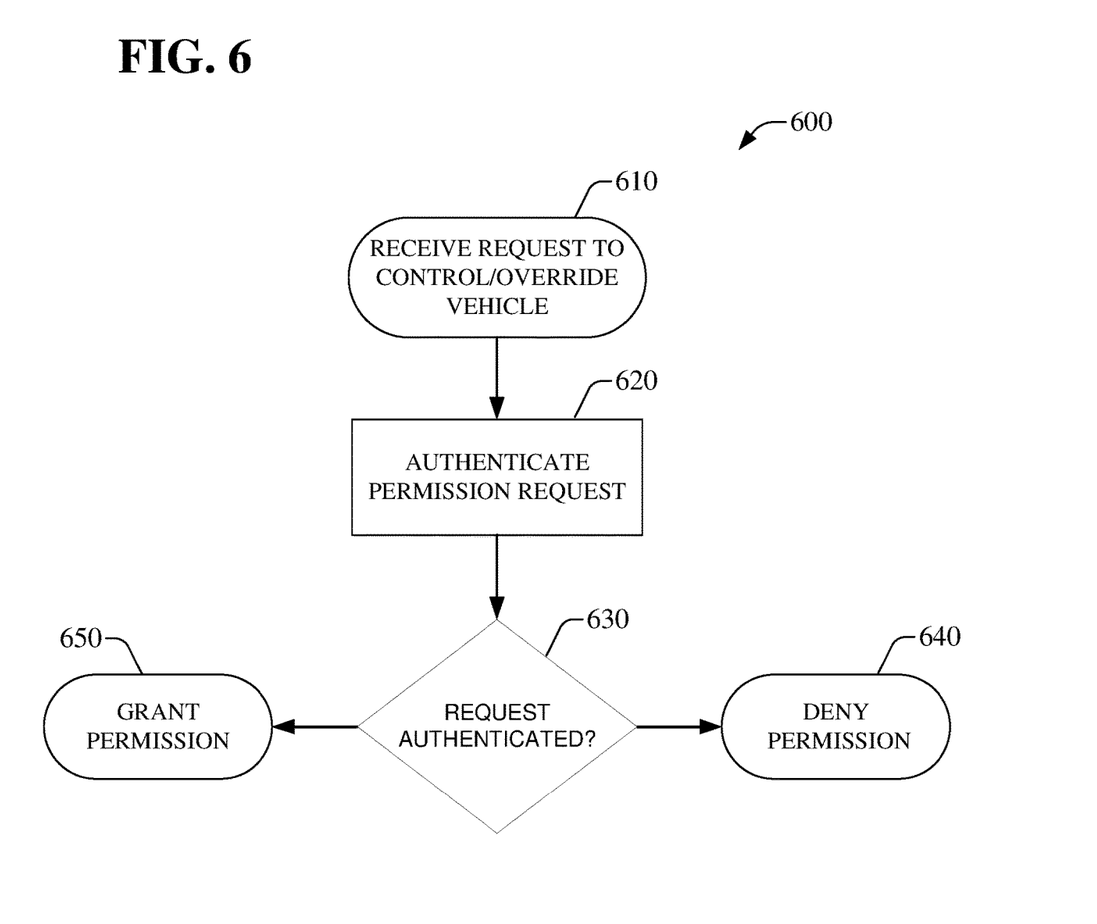
FIG. 6 is a flow diagram of an exemplary methodology that facilitates enabling a remote law enforcement device to take control of a vehicle in accordance with an aspect of the subject specification.

Referring next to FIG. 6, a flow chart illustrating an exemplary method that facilitates enabling a remote law enforcement device to take control of a vehicle according to an embodiment is provided. As illustrated, process 600 includes a series of acts that may be performed by a device (e.g., vehicle device 120 or 500) according to an aspect of the subject specification, wherein the series of acts may include any of the plurality of acts described with respect to vehicle device 120 or 500. For instance, process 600 may be implemented by employing a processor to execute computer executable instructions stored on a computer readable storage medium to implement the series of acts. In another embodiment, a computer-readable storage medium comprising code for causing at least one computer to implement the acts of process 600 is contemplated.

As illustrated, process 600 may begin at act 610 with communication component 530 receiving a control/override permission request from a remote device (e.g., law enforcement device 140) in which the control/override permission request is received from the remote device via a wireless communication protocol (e.g., via a WiFi network, an RFID network, a Bluetooth network, etc.). At act 620, authentication component 540 then performs an authentication of the control/override permission request (e.g., where the authentication depends on whether a pursuing vehicle is within a threshold distance from a pursued vehicle). A determination of whether the requesting device has authorization to control/disable a subsystem of the vehicle is then reached at act 630. If the requesting device's request is not authenticated, then process 600 concludes at act 640 with a denial of the control/override permission request. Otherwise, if the requesting device's request is indeed authenticated, then process 600 concludes at act 650 with a granting of the control/override permission request.

Exemplary Law Enforcement Device Embodiments

Figure 7:
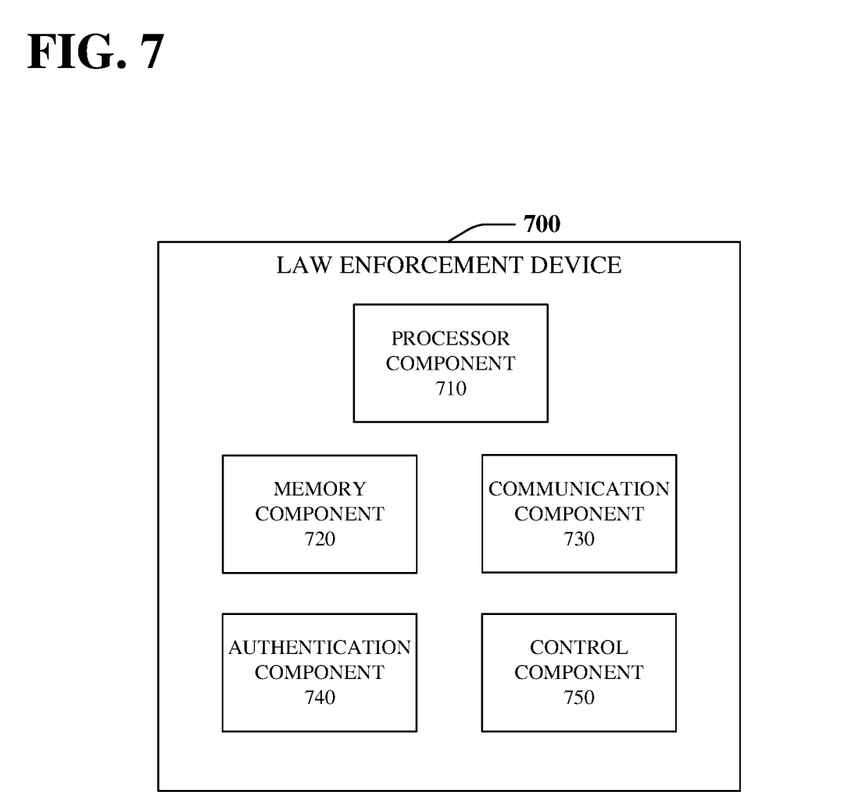
FIG. 7 illustrates a block diagram of an exemplary law enforcement device that facilitates implementing aspects disclosed herein.

Referring next to FIG. 7, a block diagram of an exemplary law enforcement device is provided, wherein it is contemplated that law enforcement device 700 is substantially similar to law enforcement device 140. As illustrated, law enforcement device 700 may include a processor component 710, a memory component 720, a communication component 730, an authentication component 740, and a control component 750. Components 710-740 may reside together in a single location or separately in different locations in various combinations, including, for example, a configuration in which at least one of the aforementioned components reside in a cloud, police vehicle, and/or police station.

Similar to processor component 510 in vehicle device 500, processor component 710 is configured to execute computer-readable instructions related to performing any of a plurality of functions. Processor component 710 can be a single processor or a plurality of processors which analyze and/or generate information utilized by memory component 720, communication component 730, authentication component 740, and/or control component 750. Additionally or alternatively, processor component 710 may be configured to control one or more components of law enforcement device 700.

In another aspect, memory component 720 is coupled to processor component 710 and configured to store computer-readable instructions executed by processor component 710. Memory component 720 may also be configured to store any of a plurality of other types of data including data generated by any of communication component 730, authentication component 740, and/or control component 750. Memory component 720 may be configured to store any of several types of information explained above, including a GPS location of law enforcement device 700, for example. Here, it should be noted that memory component 720 is analogous to memory component 520 in vehicle device 500. Accordingly, it should be appreciated that any of the aforementioned features/configurations of memory component 520 are also applicable to memory component 720.

Communication component 730 may be used to interface law enforcement device 700 with external entities. For example, communication component 730 may be configured to receive and/or transmit data via a network (See e.g., FIG. 1). In a particular embodiment, communication component 730 is configured to transmit a permission request to control/override at least one device on a vehicle from a remote device (e.g., from a pursuing police vehicle or a police station) in which the control/override permission request is transmitted via a wireless communication protocol (e.g., via a WiFi network, an RFID network, a Bluetooth network, etc.). Here, it should be appreciated that such transmission may be a transmission directly to the vehicle (e.g., directly to the vehicle from a pursuing vehicle or police station) or indirectly to the vehicle via an intermediary (e.g., where a pursuing vehicle transmits a control/override permission request to a police station (e.g., for authentication purposes), and then the police station forwards the request to the vehicle).

As illustrated, law enforcement device 700 also includes authentication component 740 and control component 750. Here, it is contemplated that authentication component 740 is configured to authenticate whether the remote device has authorization to control the at least one device on the vehicle (e.g., where the authentication depends on whether a pursuing vehicle is within a threshold distance from a pursued vehicle; inclusion of the requesting device on a whitelist/blacklist; etc.), whereas control component 750 is configured to control the at least one device from the remote device based on an authentication of the remote device to control the at least one device (e.g., where "control" may be defined to include override control which disables an ability of a driver of the vehicle to control the at least one device).

Several embodiments are contemplated for when authentication depends on the distance between a pursuing vehicle and a pursued vehicle. For instance, authentication component 740 may be configured to determine whether the pursuing vehicle is within the threshold distance based on a detection of a signal transmitted from the pursued vehicle. In a particular embodiment, it is contemplated that law enforcement device 700 resides in a pursuing vehicle (e.g., a police vehicle), wherein communication component 730 may be configured to transmit a signal from the pursuing vehicle to the vehicle, and wherein authentication component 740 may be configured to authenticate the pursuing vehicle based on whether communication component 730 then receives confirmation from the vehicle that the signal was indeed detected (e.g., where the communication protocol between the pursued vehicle and the pursuing vehicle has a detection range that is less than the threshold distance including, for example, where the communication is one of an RFID communication, a Bluetooth communication, or a WiFi communication). Alternatively, authentication component 740 may be configured to determine whether the pursuing vehicle is within the threshold distance by comparing a GPS location of the pursuing vehicle with a GPS location of the pursued vehicle.

It is also contemplated that authentication component 740 may be configured to authenticate whether the remote device (e.g., on a pursuing police vehicle and/or a police station) has authorization to control the at least one device on the vehicle based on the particular subsystem(s) the remote device is requesting to control/override. For example, a request from a remote device to control/override the vehicle's sound system may require that a pursuing police vehicle be within a threshold distance, whereas a request from a remote device to control/override any of the vehicle's drive-related subsystems may additionally require authorization from a supervisor (e.g., a police commander).

Figure 8:
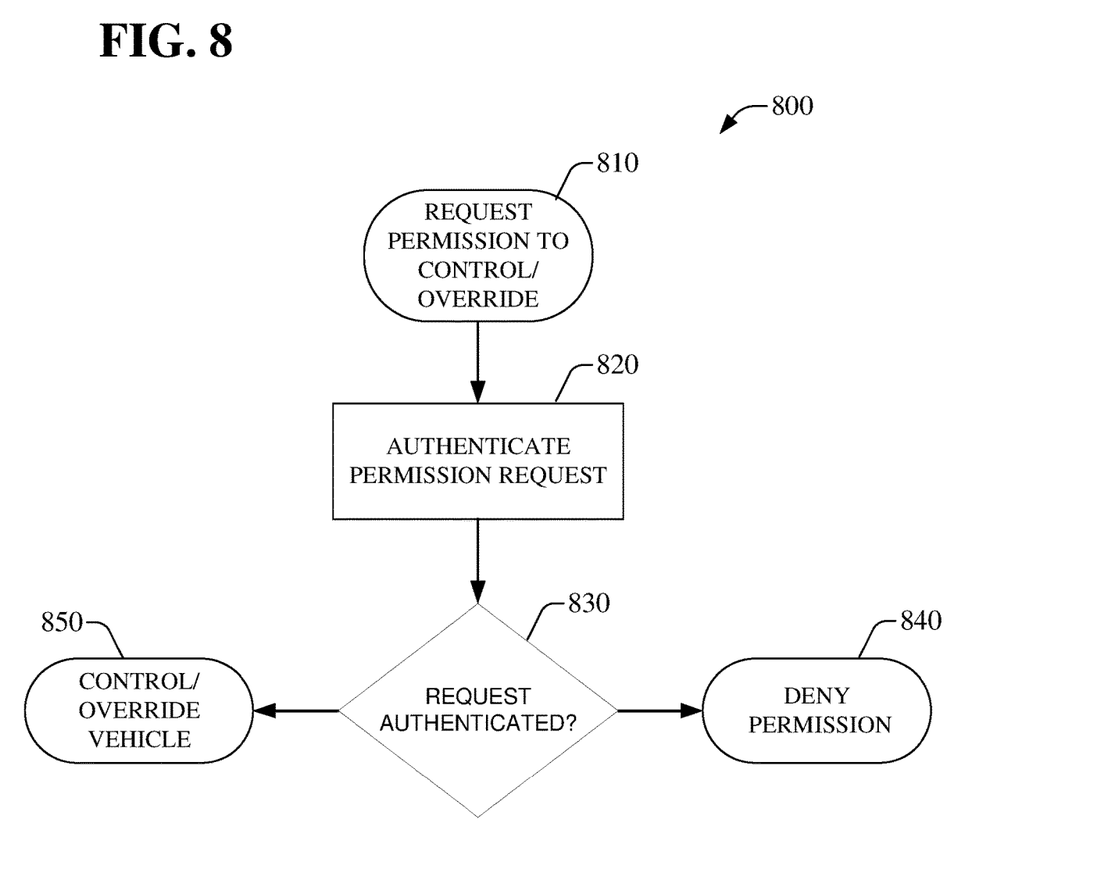
FIG. 8 is a flow diagram of an exemplary methodology that facilitates taking control of a vehicle from a remote law enforcement device in accordance with an aspect of the subject specification.

Referring next to FIG. 8, a flow chart illustrating an exemplary method that facilitates taking control of a vehicle from a remote law enforcement device according to an embodiment is provided. As illustrated, process 800 includes a series of acts that may be performed by a device (e.g., law enforcement device 140 or 700) according to an aspect of the subject specification, wherein the series of acts may include any of the plurality of acts described with respect to law enforcement device 140 or 700. For instance, process 800 may be implemented by employing a processor to execute computer executable instructions stored on a computer readable storage medium to implement the series of acts. In another embodiment, a computer-readable storage medium comprising code for causing at least one computer to implement the acts of process 800 is contemplated.

As illustrated, process 800 may begin at act 810 with communication component 730 transmitting a control/override permission request (e.g., from law enforcement device 700 to vehicle device 500) in which the control/override permission request is transmitted via a wireless communication protocol (e.g., via a WiFi network, an RFID network, a Bluetooth network, etc.). At act 820, authentication component 740 then authenticates the control/override permission request (e.g., where the authentication depends on whether a pursuing police vehicle is within a threshold distance from a pursued vehicle). A determination of whether the requesting device (e.g., a pursuing police vehicle) has authorization to control/disable a subsystem of the vehicle is then reached at act 830. If the requesting device's request is not authenticated, then process 800 concludes at act 840 with a denial of the control/override permission request. Otherwise, if the requesting device's request is indeed authenticated, then process 800 concludes at act 850 with a granting of the control/override permission request, wherein law enforcement device 700 may then control/override the particular subsystem(s) on the vehicle included in the request.

Exemplary Networked and Distributed Environments

One of ordinary skill in the art can appreciate that various embodiments for implementing the use of a computing device and related embodiments described herein can be implemented in connection with any computer or other client or server device, which can be deployed as part of a computer network or in a distributed computing environment, and can be connected to any kind of data store. Moreover, one of ordinary skill in the art will appreciate that such embodiments can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 9:
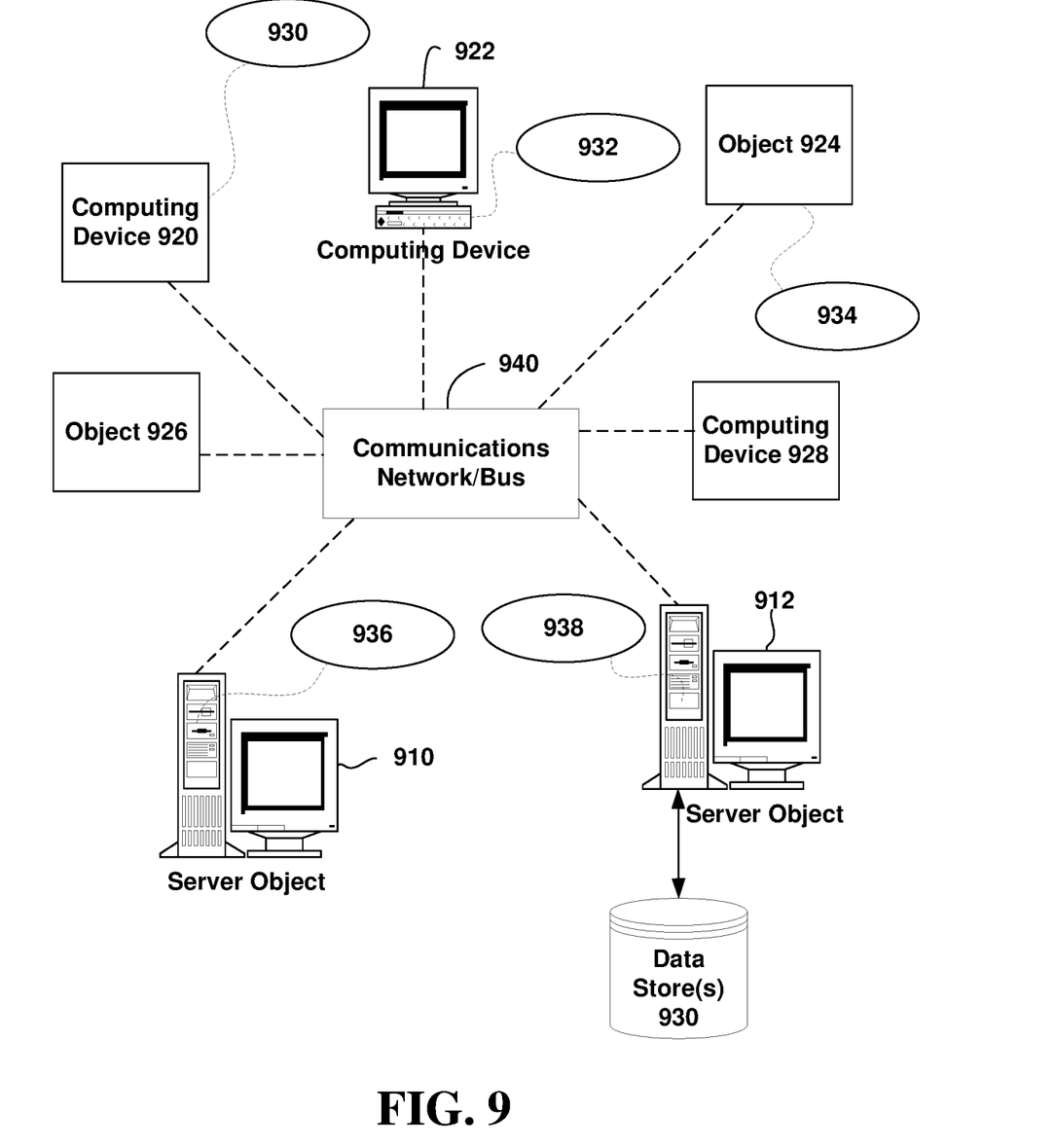
FIG. 9 is a block diagram representing exemplary non-limiting networked environments in which various embodiments described herein can be implemented.

FIG. 9 provides a non-limiting schematic diagram of an exemplary networked or distributed computing environment. The distributed computing environment comprises computing objects or devices 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects or devices 910, 912, etc. and computing objects or devices 920, 922, 924, 926, 928, etc. may comprise different devices, such as PDAs (personal digital assistants), audio/video devices, mobile phones, MP3 players, laptops, etc.

Each computing object or device 910, 912, etc. and computing objects or devices 920, 922, 924, 926, 928, etc. can communicate with one or more other computing objects or devices 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object or device 910, 912, etc. or 920, 922, 924, 926, 928, etc. can also contain an application, such as applications 930, 932, 934, 936, 938, that might make use of an API (application programming interface), or other object, software, firmware and/or hardware, suitable for communication with or implementation of the disclosed aspects in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects or devices 910, 912, etc. can be thought of as servers where computing objects or devices 910, 912, etc. provide data services, such as receiving data from computing objects or devices 920, 922, 924, 926, 928, etc., storing of data, processing of data, transmitting data to computing objects or devices 920, 922, 924, 926, 928, etc., although any computer can be considered a client, a server, or both, depending on the circumstances. Any of these computing devices may be processing data, or requesting services or tasks that may implicate aspects and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 940 is the Internet, for example, the computing objects or devices 910, 912, etc. can be Web servers with which the computing objects or devices 920, 922, 924, 926, 928, etc. communicate via any of a number of known protocols, such as HTTP. As mentioned, computing objects or devices 910, 912, etc. may also serve as computing objects or devices 920, 922, 924, 926, 928, etc., or vice versa, as may be characteristic of a distributed computing environment.

Exemplary Computing Device

As mentioned, several of the aforementioned embodiments apply to any device wherein it may be desirable to include a computing device to facilitate implementing the aspects disclosed herein. It is understood, therefore, that handheld, portable and other computing devices and computing objects of all kinds are contemplated for use in connection with the various embodiments described herein. Accordingly, the below general purpose remote computer described below in FIG. 10 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 10:
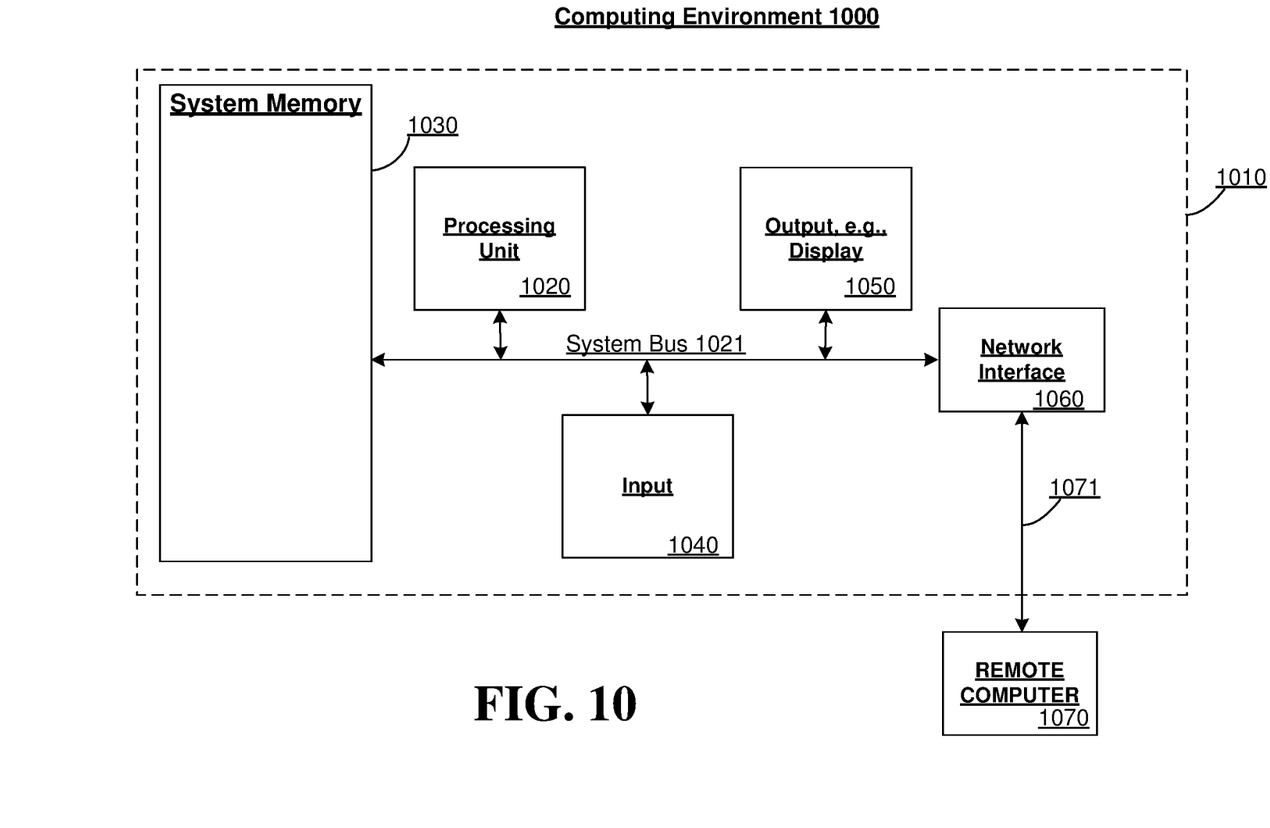
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or more of the embodiments may be implemented, although as made clear above, the computing system environment 1000 is only one example of a suitable computing environment and is not intended to suggest any limitation as to the scope of use or functionality of any of the embodiments. The computing environment 1000 is not to be interpreted as having any dependency or requirement relating to any one or combination of components illustrated in the exemplary operating environment 1000.

With reference to FIG. 10, an exemplary remote device for implementing one or more embodiments herein can include a general purpose computing device in the form of a handheld computer 1010. Components of handheld computer 1010 may include, but are not limited to, a processing unit 1020, a system memory 1030, and a system bus 1021 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user may enter commands and information into the computer 1010 through input devices 1040 A monitor or other type of display device is also connected to the system bus 1021 via an interface, such as output interface 1050. In addition to a monitor, computers may also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1071, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to implement the aspects disclosed herein.

There are multiple ways of implementing one or more of the embodiments described herein, e.g., an appropriate API, tool kit, driver code, operating system, control, standalone or downloadable software object, etc. which enables applications to implement the aspects disclosed herein. Embodiments may be contemplated from the standpoint of an API (or other software object), as well as from a software or hardware object that facilitates implementing the aspects disclosed herein in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment.

What is claimed is:

1. A control unit device residing on a vehicle, comprising:
a communication component configured to receive a control permission request originating from a remote device that resides in a location different than a location of a pursuing vehicle of the vehicle;
an authentication component configured to perform a proximity-based authentication of the remote device based on whether the pursuing vehicle is within a threshold distance from the vehicle, wherein the proximity-based authentication is a determination of whether the remote device has authorization to control at least one device on the vehicle; and
a control component configured to grant the remote device control of the at least one device on the vehicle based on the proximity-based authentication, wherein the control component is further configured to process commands received from the remote device to control the at least one device on the vehicle.

2. The control unit device of claim 1, wherein the threshold distance is one hundred meters.

3. The control unit device of claim 1, wherein the authentication component is further configured to determine whether the pursuing vehicle is within the threshold distance based on a detection of a signal transmitted from the pursuing vehicle.

4. The control unit device of claim 3, wherein the communication component is further configured to detect signals transmitted from the pursuing vehicle within a detection range of the vehicle, and wherein the detection range is less than the threshold distance.

5. The control unit device of claim 4, wherein the signal transmitted from the pursuing vehicle is one of a radio frequency identification (RFID) communication, a Bluetooth communication, or a WiFi communication.

6. The control unit device of claim 3, wherein the remote device resides in the pursuing vehicle, and wherein the signal transmitted from the pursuing vehicle is the control permission request.

7. The control unit device of claim 1, wherein the authentication component is further configured to determine whether the pursuing vehicle is within the threshold distance based on a communication received from the remote device.

8. A control unit device residing on a vehicle, comprising:
a communication component configured to receive a disable request originating from a remote device that resides in a location different than a location of a pursuing vehicle of the vehicle;
an authentication component configured to perform a proximity-based authentication of the remote device based on whether the pursuing vehicle is within a threshold distance from the vehicle, wherein the proximity-based authentication is a determination of whether the remote device has authorization to disable at least one device on the vehicle; and a control component configured to grant the remote device disable control of the at least one device on the vehicle based on the proximity-based authentication, wherein the disable control facilitates remotely disabling the at least one device of the vehicle via commands received from the remote device.

9. The control unit device of claim 8, wherein the control component is further configured to grant the remote device disable control while the vehicle is in operation.

10. The control unit device of claim 9, wherein the at least one device is one of an acceleration system, an ignition system, a braking system, or a steering system.

11. The control unit device of claim 9, wherein the at least one device is one of a power window system, a door lock system, or a seatbelt system.

12. The control unit device of claim 9, wherein the at least one device is one of a light system, a horn system, or an audio system.

13. A method, comprising:
   employing a processor to execute computer executable instructions stored on a computer readable storage medium to implement the following acts:
      requesting permission to disable at least one device on a vehicle from a remote device that resides in a location different than a location of a pursuing vehicle of the vehicle;
      performing a proximity-based authentication of the remote device based on whether the pursuing vehicle is within a threshold distance from the vehicle, wherein the proximity-based authentication is a determination of whether the remote device has authorization to disable at least one device on the vehicle; and
      disabling the at least one device from the remote device based on the proximity-based authentication, wherein the disabling comprises processing commands originating from the remote device to disable the at least one device on the vehicle.

14. The method of claim 13, wherein a level of authentication required to disable the at least one device varies depending on a type of the at least one device.

15. The method of claim 14, wherein a permission request corresponding to a drive-related device requires a higher level of authentication than a permission request corresponding to a non-drive-related device.

16. The method of claim 13, further comprising determining whether the pursuing vehicle is within the threshold distance from the vehicle, wherein the determining comprises transmitting a signal from the pursuing vehicle to the vehicle.

17. The method of claim 16, wherein the determining comprises receiving confirmation from the vehicle that the signal was detected.

18. The method of claim 16, wherein the determining comprises comparing a GPS location of the pursuing vehicle with a GPS location of the vehicle.

19. The method of claim 13, wherein the disabling comprises disabling an acceleration system of the vehicle.

* * * * *